Sept. 21, 1948.  J. E. SELLERS ET AL  2,449,821
METHOD FOR PREPARING ORGANO-SILICON COMPOUNDS
Filed Dec. 8, 1945
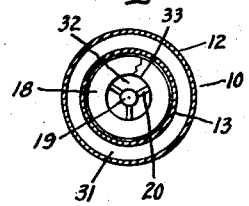
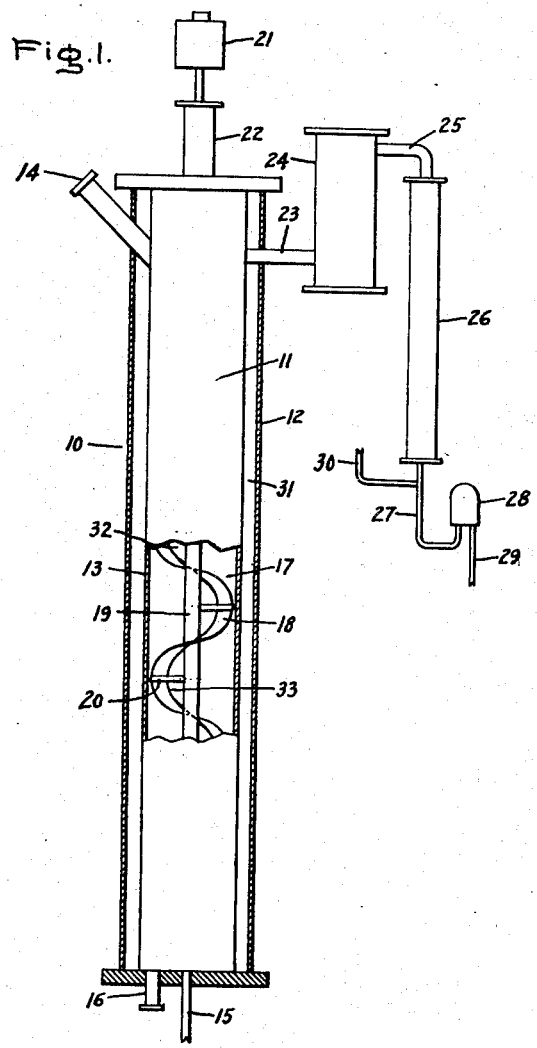
Inventors:
Jesse E. Sellers,
John L. Davis,
by
Their Attorney.

Patented Sept. 21, 1948

2,449,821

UNITED STATES PATENT OFFICE 2,449,821

METHOD FOR PREPARING ORGANO-SILICON COMPOUNDS

Jesse E. Sellers, Scotia, and John L. Davis, Schenectady, N. Y., assignors to General Electric Company, a corporation of New York Application December 8, 1945, Serial No. 633,818

1 Claim. (Cl. 260—448.2)

This invention relates to certain new and useful improvements in the preparation of organo-silicon compounds, more particularly organo-halogeno-silanes, e. g., methylchlorosilanes, and includes both method and apparatus features.

The preparation of organo-silicon halides by bringing a hydrocarbon halide, e. g., methyl chloride, into contact with a mass comprising silicon alone or admixed with a metallic catalyst for the reaction between silicon and a hydrocarbon halide, is described and broadly claimed in, for example, Rochow U. S. Patent No. 2,380,995, issued August 7, 1945, and assigned to the same assignee as the present invention. The products of the reaction may comprise any or all of the various organo-silicon halides of the general formula $$R_nSiX_{4-n}$$

where R represents a monovalent hydrocarbon radical, e. g., an alkyl, aryl, aralkyl or alkaryl radical, X represents a halogen atom, e. g., chlorine, bromine, iodine or fluorine, and $n$ is 1, 2 or 3, along with various other silicon compounds, e. g., silicon tetrahalide, tetra-organo silane, mono-organo dihalogenosilane, etc. The reaction between the hydrocarbon halide and the silicon is highly exothermic, and for this reason it is desirable that the heat of reaction be so controlled as to prevent the temperature in the reaction zone from rising excessively. The immediate result of an uncontrolled increase in the temperature of the reaction mass is the formation of more of the less desirable tri- and tetra-halide compounds and an undesirable deposition of carbon on the silicon mass.

The rate of reaction between a hydrocarbon halide and silicon is markedly dependent upon the amount of the surface presented by the silicon reactant. Hence it is desirable in the preparation of organo-silicon compounds by reaction between silicon and an organic compound which is reactable therewith, e. g., a hydrocarbon halide, to use the silicon reactant in the finely divided or powdered state. However, because of the very low thermal conductivity of silicon powder and the relatively low heat capacity of the gaseous reaction products, the removal of the heat of reaction from a stationary mass of the silicon reactant at a rate sufficient to control the reaction temperature is extremely difficult. One method of solving this difficulty is disclosed and claimed in Reed and Coe U. S. Patent No. 2,389,931, issued November 27, 1945, and assigned to the same assignee as the present invention. The method of Reed and Coe in its preferred form comprises contacting a hydrocarbon halide with the silicon reactant in finely divided state under conditions of violent agitation with provision for removing hot, unreacted silicon powder from the reaction zone, cooling it, and reinjecting the cooled powder into the reaction zone in such quantity as to absorb the high heat of reaction and effect precise control over the reaction temperature. The movement and agitation of the powder in the reaction zone and the circulation of the powder through a cooling zone is accomplished by non-mechanical, fluid-dynamical means.

The present invention is concerned with a relatively simple and economical method that is essentially different from the method of Reed et al., but which is directed to a similar objective, namely, to effect reaction between a hydrocarbon compound reactable with silicon, specifically a hydrocarbon halide, and a mass comprising silicon alone or admixed with a catalyst, more particularly a metallic catalyst, e. g., copper, whereby the reaction temperature may be readily controlled so as to obtain a maximum yield of the desired reaction products and a minimum amount of the less desirable reaction products. Our invention, which includes apparatus features, also results in intimate contact between the hydrocarbon halide reactant and silicon, as well as efficient utilization of the catalyst (if employed) and the deposition of little or no carbon upon the silicon-containing mass.

The invention will be readily understood from the following description thereof taken in connection with the accompanying drawing wherein Figure 1 is a somewhat diagrammatic view of one form of apparatus embodying our invention and which is suitable for use in practicing the method of the invention; and Figure 2 is a view in cross-section of the reactor shown in Figure 1.

Briefly described, the present invention in its broadest aspect comprises introducing into a reaction zone (1) a finely divided mass comprising silicon alone or admixed with a catalyst and (2) a hydrocarbon compound which is reactable, e. g., in vapor state, with the silicon component of the said mass, for instance a hydrocarbon halide such, for example, as methyl chloride. The reaction zone is heated by suitable means to a temperature sufficiently high to effect reaction between the hydrocarbon compound and the silicon. The silicon-containing mass is moved (e. g., by means of a mechanical conveyor) through the reaction zone in the region adjacent the side walls defining the same while at the same time it is being contacted by the said hydrocarbon compound. Both the silicon-containing mass and the hydrocarbon compound are at reaction temperature, e. g., in the case of methyl chloride at a temperature within the range of about 200° to 500° C., preferably about 250° to 350° C., and hence reaction between these reactants is effected in the region adjacent the side walls of the reaction chamber. As a result, the heat of reaction is readily conveyed away from the reaction zone and an excessive rise of temperature is avoided. Thereafter, travel of the moving mass through the reaction zone as above described is reversed, and the mass containing unreacted silicon then moves through the central portion of the reaction zone in contact with the hydrocarbon compound so that further reaction between the reactants may take place.

The organo-silicon compounds, e. g., organo-halogeno-silanes, produced by the reaction between the hydrocarbon compound, e. g., a hydrocarbon halide, and the silicon component of the aforesaid mass are withdrawn from the reaction zone in any convenient manner. For example, the organo-silicon compounds may be removed in the form of a vapor admixed with unreacted hydrocarbon compound. The vaporous mixture may be condensed in one or more stages, the organo-silicon compounds separated from such unreacted hydrocarbon compound as may be present, and the latter then returned, if desired, to the reaction zone for further reaction.

The invention will be described with particular reference to the preparation of methylchlorosilanes (methyl silicon chlorides) by effecting reaction between methyl chloride and silicon. It is to be understood, however, that it is not limited thereto but is broadly applicable to the reaction of silicon (elementary silicon) in finely divided or other suitable state with other organic compounds reactable therewith, e. g., other hydrocarbon halides, alcohols, e. g., methyl alcohol, etc. For instance, our invention (both method and apparatus features) may be employed in the preparation of other alkyl silicon halides (alkyl-halogenosilanes), e. g., ethyl, propyl, butyl, amyl, isoamyl, hexyl, etc., silicon halides (chlorides, bromides, etc.); the aryl silicon halides, e. g., phenyl silicon halides (chloride, bromides, etc.); the aryl-substituted aliphatic silicon halides, e. g., phenylethyl silicon halides, phenylpropyl silicon halides, etc.; aliphatic-substituted aryl silicon halides, e. g., tolyl silicon halides, xylyl silicon halides, etc.; mixed organo-silicon halides, e. g., methyl ethyl silicon halides, methyl phenyl silicon halides, ethyl phenyl silicon halides, etc.; alkylene silicon halides, e. g., ethylene silicon chlorides and others such as described and claimed in, for instance, Patnode and Schiessler U. S. Patent No. 2,381,000, issued August 7, 1945, and assigned to the same assignee as the present invention; and in the production of organo silicates such, for example, as methyl silicate prepared by effecting reaction between methyl alcohol and finely divided silicon.

The finely divided or powdered silicon reactant may be pure or substantially pure elementary silicon alone or admixed (or in the form of an alloy) with a catalyst for the reaction or with a substance which is merely a solid diluent for the silicon. Although copper is a preferred catalyst, especially in the preparation of methylchlorosilanes, other catalysts may be employed, e. g., nickel, tin, antimony, manganese, titanium, etc.

Referring to the drawing, Figure 1 shows by way of illustration one form of apparatus adapted for carrying into effect the method features of our invention. The reactor 10, which preferably is annular in form, comprises a reaction chamber 11 provided with a casing or housing 12. A vertical reaction chamber preferably is employed, and advantageously one having a height about five to 35 times its diameter, more particularly a height about ten to 30 times its diameter. The side wall 13 of the reaction chamber forms the inner wall of the casing 12. The inlet 14 provides means for introducing into the reaction chamber a finely divided mass comprising silicon alone or admixed with a catalyst, e. g., copper, while the inlet 15 provides means for introducing a silicon-reactable hydrocarbon compound, e. g., methyl chloride, into the chamber 11. A suitable opening or outlet is provided for withdrawing from the reaction chamber the mixture of copper (or other catalyst that may have been employed) and any unreacted silicon. For instance, such opening may be an outlet 16 located in the lower portion of the reaction chamber 11.

The reaction chamber 11 is provided with means for moving the silicon-containing mass upwardly through the chamber in the region adjacent the side wall 13. As shown by way of illustration in Figure 1, such means advantageously may be in the form of a conveyor 17, more particularly a helical ribbon conveyor capable of moving the silicon-containing mass from the bottom (or from a point very close to the bottom) of the reaction chamber spirally upwardly through the chamber. The ribbon flight 18 is mounted on the drive shaft 19 by means of horizontal lugs 20. The drive shaft 19 is driven at a suitable rate, e. g., at about 30 to 600 R. P. M., by any suitable means, for instance by means of the geared motor 21 through the stuffing box 22.

The helical ribbon conveyor 17 may be made by, for example, bending a flat strip of metal edgewise into a helix, which is then mounted as above described. The outside diameter of the helix is such that the outer edge of the conveyor and the inside of the side wall 13 of the reaction chamber are very close to each other. The clearance between these parts should be such that no binding of the parts takes place during operation of the apparatus. Satisfactory results have been obtained with clearances of the order of $\frac{1}{16}$ to $\frac{1}{8}$ inch on a side (overall clearance of $\frac{1}{8}$ to $\frac{1}{4}$ inch). The ratio of the cross-sectional area of the flight 18 to the cross-sectional area of the annular space 32 should be such that the silicon-containing material lifted by the flight will fall freely through the annular space. For example, satisfactory results have been obtained when the cross-sectional area of the annular space was from about 65 to 80% of the cross-sectional area of the flight 18. In most cases we prefer that the cross-sectional area of the annular space 32 be about 75% of the cross-sectional area of the flight 18.

A conduit 23 conveys the vaporous reaction products and any unreacted hydrocarbon compound, e. g., methyl chloride, from the upper portion of the reaction chamber 11, thence through the filter 24, which contains a suitable porous filtering medium, e. g., glass wool or fibers, etc. Any finely divided solid matter that may be suspended in the outgoing vapors is removed by this filter. From the filter 24 the vapors pass through the conduit 25 to the condenser 26, which for simplicity of illustration is shown as a single condenser, although ordinarily two or more condensers are used. The condensate passes through the conduit 27, through the specific gravity sight glass 28, and thence through the conduit 29 to a suitable receiving vessel (not shown). The vapors which are not condensed in the condenser 26 may be withdrawn through the conduit 30, and disposed of in any suitable manner, for instance in the manner described later herein.

The casing or housing 12 which surrounds the side walls of the reaction chamber 11 to form an annular space 31 therebetween is adapted to receive a fluid medium, which may be, for instance, an oil (e. g., a mineral oil), Dowtherm A (a eutectic mixture of diphenyl and diphenyl oxide) or any other fluid medium capable of being heated to a temperature sufficiently high to effect reaction between silicon and a silicon-reactable hydrocarbon compound, for instance a hydrocarbon halide such, for example, as methyl chloride. This fluid medium may be heated by any suitable means (not shown), as by electric heating, combustion gases, contact with hotter fluid mediums as in heat exchangers, etc. The fluid medium is introduced into the annular space 31 through a suitable opening or openings (not shown) in the casing 12 or in the top and bottom walls of the reactor 10. Preferably the fluid medium is circulated through the annular space 31 by suitable means. For instance, if a liquid fluid medium such, for example, as mineral oil, Dowtherm A, etc., is employed, a circulating pump (not shown) may be used to circulate the oil through this space, the hot liquid medium entering the casing 12 at, for example, the bottom portion thereof and leaving at the top through suitable openings (not shown).

In order that those skilled in the art better may understand how the method features of our invention may be practiced, the following description is given by way of illustration with particular reference to the preparation of methylchlorosilanes by effecting reaction between gaseous methyl chloride and a finely divided or powdered mass comprising silicon and copper:

A suitable amount of a finely divided mixture of silicon and copper (elementary copper) is charged into the reaction chamber 11 through the inlet 14. The proportions of silicon and copper may be varied as desired or as conditions may require, for instance as described in Rochow and Patnode Patent No. 2,380,996, page 4, column 1, lines 23–60. Ordinarily, we use a silicon-copper mixture containing, by weight, from about 5 to 15 or 20 parts copper and 80 or 85 to 95 parts silicon. An unfired mixture of silicon and copper may be used, or the finely divided copper may be fired under reducing conditions, e. g., in an atmosphere of hydrogen, at temperatures of the order of 350° to 700° C., preferably about 450° C., prior to mixing it with the finely divided silicon. Or, unfired copper particles or copper particles which have been fired in the manner above described may be mixed with the silicon and the mixture then fired in a reducing atmosphere, e. g., hydrogen, at temperatures of the order of 700° to 1050° C.

The silicon-copper mixture is stirred continuously in the reaction chamber 11 by means of the ribbon conveyor 17, which is driven by the geared motor 21 through the stuffing box 22 so that the mixture on top of the flight 18 will be carried vertically up the tube.

The reaction chamber 11 is heated by suitable means, e. g., by means of hot oil, Dowtherm A, etc., circulating in the annular space 31. Methyl chloride is introduced continuously through inlet 15 to the chamber from a suitable supply source (not shown). Fresh methyl chloride may be used alone or admixed with methyl chloride recovered from a mixture thereof with products of the reaction. When the temperature in the reaction chamber is sufficiently high (e. g., 200° to 400° C.), reaction takes place between the methyl chloride and the silicon component of the mixture as the latter is being carried up the reaction chamber in the region adjacent the side walls thereof.

Considerable heat is liberated by the reaction, and the copper-silicon mixture must be stirred or otherwise agitated in order to prevent hot spots in the reaction zone with obvious disadvantages. By our method and apparatus, whereby the copper-silicon mixture is being borne upwardly in the region adjacent the side walls of the reaction chamber, and whereby when the exothermic reaction between the silicon and the methyl chloride does take place in this region the heat of reaction is readily and quickly carried away from the reaction zone (e. g., by the oil or other fluid medium in the annular space 31), the danger of hot spots is obviated and it is possible to control the temperature so that there will be minimum formation of the less desirable reaction products and little or no deposition of carbon on the silicon-copper mixture. A further advantage resulting from our apparatus and process is due to the fact that the flight 18 imparts a turbulent motion to the particles of silicon-containing mass adjacent to the side wall 13, thus improving the heat transfer to the side wall and hence to the fluid medium in the annular space 31.

The copper-silicon mixture that is borne upwardly in the reaction chamber in contact with the methyl chloride then falls downwardly by gravity through the annular space 32 in the central portion of the reaction chamber, which space is defined by the inside edge 33 of the ribbon flight 18 and the drive shaft 19. Since the flight 18 and the horizontal lugs 20 impart some radial motion to the copper-silicon mixture, it follows a spiral course as it moves upwardly through the reaction chamber and also as it falls downwardly through the chamber 12 in the annular space 32, where it contacts rising gaseous methyl chloride. The copper-silicon mixture which falls through the annular space 32 is picked up by the flight 18 and again elevated, thus continuously circulating the mixture in the lengthwise direction of the chamber.

In the preferred embodiment of our invention the methyl chloride is introduced into the bottom of the reaction chamber and the reaction products together with unreacted methyl chloride are withdrawn from the upper portion of the chamber, e. g., through the conduit 23. For these reasons and in view of the close temperature control and other desirable results obtained, we believe that most of the reaction between the silicon and the methyl chloride takes place in the zone having therein the ribbon flight 18, which zone is defined by the edge 33 of the flight 18 and the inner surface of the side wall 13. It is from this zone adjacent to the fluid medium in the annular space 31 that the heat of reaction is most readily and efficiently dissipated to said medium and is thereby carried away from the reaction zone, thus avoiding an objectionable increase in temperature.

After passing through conduit 23, filter 24 and conduit 25, the effluent vapors are largely condensed in the condenser 26, which is suitably cooled, e. g., by cold, flowing water. The noncondensable portion containing methyl chloride and some of the reaction products passes through the line 30 to a compressor (not shown), and then to a refrigerated condenser (not shown) where the methyl chloride and the remaining reaction products are condensed. The condensate from this condenser is then led to a still (not shown), where the methyl chloride is stripped off, as well as any other low-boiling, undesired reaction products. The unreacted methyl chloride may be returned to the reaction chamber 11 for further reaction, while the methyl chlorosilanes may be further fractionated, if desired, to isolate substantially pure products.

As illustrative of the results obtained by practicing our above-described invention, we mention the following:

From a charge of 100 pounds of a copper-silicon mixture comprising, by weight, about 90 pounds finely divided silicon and about 10 pounds finely divided copper and a charge of 403 pounds of methyl chloride, we obtained 352 pounds of mixed reaction products having a specific gravity of 1.092 (27°/27°) and yielding the following products upon distillation:

| | Per cent by weight |
|---|---|
| Products distilling below 66° C | 12.0 |
| Methyltrichlorosilane | 21.4 |
| Dimethyldichlorosilane | 58.4 |
| Residue | 5.0 |
| Loss on distillation | 3.2 |
| | 100.0 |

What we claim as new and desire to secure by Letters Patent of the United States, is:

The method of preparing organo halogenosilanes which comprises separately introducing into a vertical reaction chamber (1) an alkyl chloride gas and (2) a finely divided mixture of silicon and a metallic catalyst for the reaction between silicon and an alkyl chloride gas, said alkyl chloride being introduced into said reaction chamber substantially continuously, maintaining the side walls of said chamber at a temperature within the range of about 200° to 500° C., spirally conveying the mixture upwardly through said reaction chamber along a path having an annular area, as viewed from the top of said reaction chamber of from about 60% to 55% of the cross-sectional area of said chamber, said material being moved in close proximity to the innerside walls of the said chamber whereby the excess heat of the reaction is effectively dissipated to maintain the side wall temperature and the reaction temperature in equilibrium, contacting said upwardly moving mixture with the said alkyl chloride thereby to effect reaction between the said chloride and the silicon component of the mixture, allowing the mixture containing unreacted silicon when its upward travel has ceased to fall downwardly through the central portion of the reaction chamber in contact with the alkyl chloride, withdrawing from the reaction chamber the alkylchlorosilanes produced by the reaction between the said alkyl chloride and the silicon component of the mass, separating the alkylchlorosilanes and the unreacted alkyl chloride from the said mixture and returning the unreacted alkyl chloride to the said reaction chamber for further reaction.

JESSE E. SELLERS.
JOHN L. DAVIS.

REFERENCES CITED

The following references are of record in the file of this patent:

UNITED STATES PATENTS

| Number | Name | Date |
|---|---|---|
| 623,892 | Fairley | Apr. 25, 1899 |
| 627,895 | Bischof | June 27, 1899 |
| 852,325 | Hall | Apr. 30, 1907 |
| 902,177 | Schwoerer | Oct. 27, 1908 |
| 1,270,997 | Wilke | July 2, 1918 |
| 1,641,544 | MacMullin et al. | Sept. 6, 1927 |
| 1,913,391 | Hutchinson | June 13, 1933 |
| 2,159,140 | Eckell | May 23, 1939 |
| 2,265,837 | Harding | Dec. 9, 1941 |
| 2,310,907 | McMillan | Feb. 9, 1943 |
| 2,380,996 | Rochow et al. | Aug. 7, 1945 |
| 2,380,998 | Sprung et al. | Aug. 7, 1945 |
| 2,380,999 | Sprung et al. | Aug. 7, 1945 |
| 2,383,818 | Rochow et al. | Aug. 28, 1945 |
| 2,389,931 | Reed et al. | Nov. 27, 1945 |

FOREIGN PATENTS

| Number | Country | Date |
|---|---|---|
| 469,518 | Great Britain | July 26, 1937 |